United States Patent [19]

Spencer, III et al.

[11] 4,396,210
[45] Aug. 2, 1983

[54] TAPE JOINT FOR CYLINDRICAL MEMBERS

[75] Inventors: Terrel Spencer, III, Little Rock; Joe D. Puckett, Benton, both of Ark.

[73] Assignee: Jacuzzi Inc., Little Rock, Ak.

[21] Appl. No.: 202,349

[22] Filed: Oct. 30, 1980

[51] Int. Cl.³ ............................................. F16L 37/14
[52] U.S. Cl. ...................................... 285/38; 285/305
[58] Field of Search ............. 285/305, 423, 421, 321, 285/38

[56] References Cited

U.S. PATENT DOCUMENTS

| | | | |
|---|---|---|---|
| 2,005,174 | 6/1935 | Williams | 285/305 X |
| 2,310,490 | 2/1943 | Melsom | 285/305 X |
| 2,458,714 | 1/1949 | Mahoney | 285/305 X |
| 3,181,897 | 5/1965 | Krayenbuhl et al. | |
| 3,239,244 | 3/1966 | Leinfelt | 285/305 X |
| 3,600,011 | 8/1971 | Alvis | |
| 3,606,402 | 7/1971 | Medney | |
| 4,040,651 | 8/1977 | LaBranche | 285/423 X |
| 4,281,860 | 8/1981 | Streit | 285/305 X |

Primary Examiner—Thomas F. Callaghan
Attorney, Agent, or Firm—Hill, Van Santen, Steadman, Chiara & Simpson

[57] ABSTRACT

A tape joint for cylindrical members is provided wherein a flexible tape member is inserted into a cavity between telescoping first and second cylindrical members in a twisted manner so as to lock the members together as a unit. The tape member is manually slip fitted into position and is provided with a handle for aiding in the insertion and removal of the tape member.

5 Claims, 5 Drawing Figures

U.S. Patent  Aug. 2, 1983  4,396,210
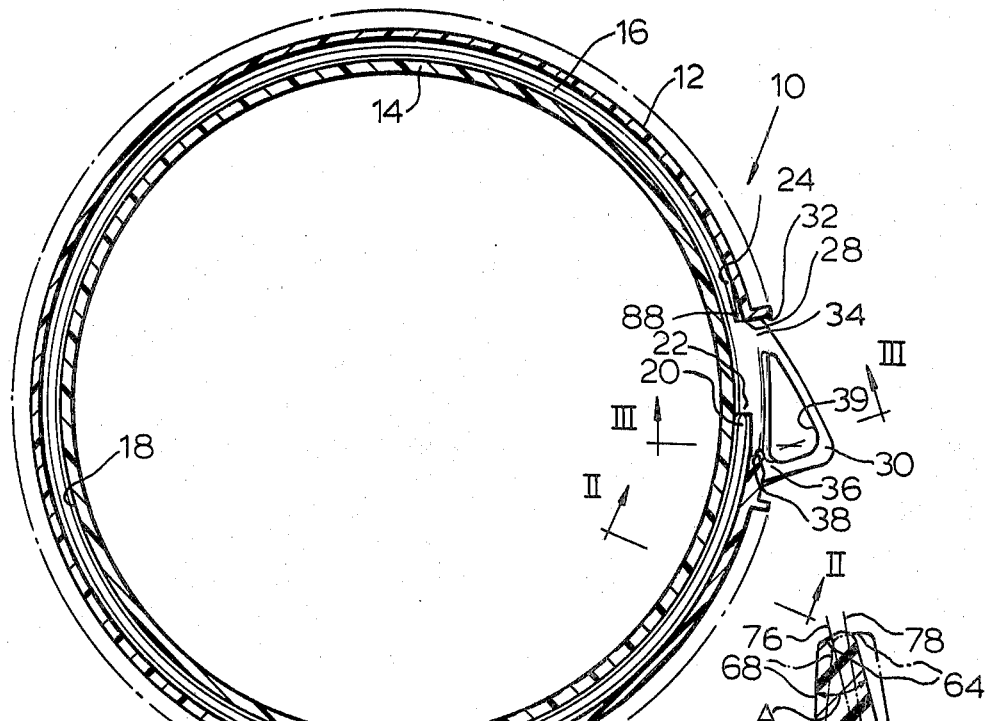
FIG 1
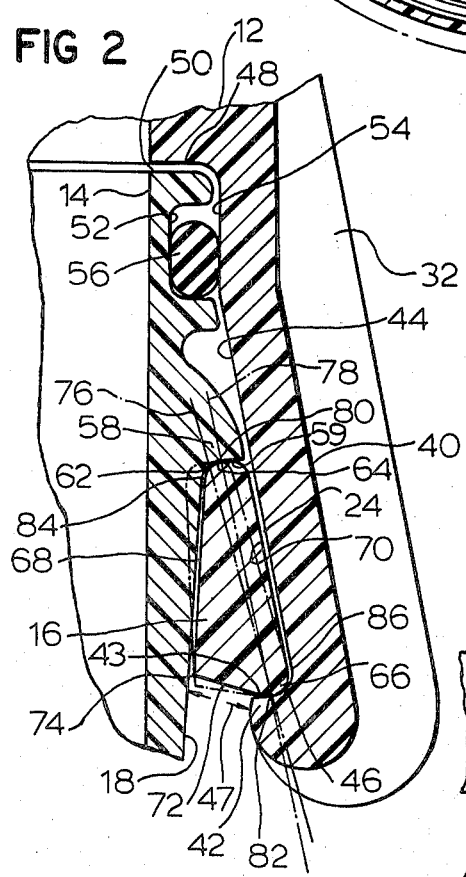
FIG 2
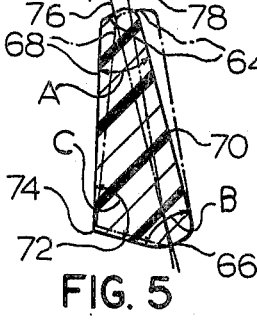
FIG. 3
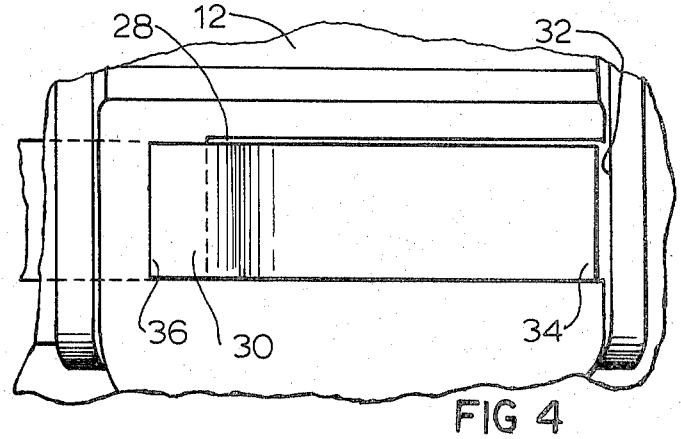
FIG 4
FIG. 5

TAPE JOINT FOR CYLINDRICAL MEMBERS

BACKGROUND OF THE INVENTION

1. Field of the Invention

This invention relates to a mechanical joint and more specifically to a tape joint for joining two cylindrical vessel members.

2. Description of the Prior Art

A metal "tape" has been used in a mechanical joint as a locking device in the assembly of cylindrical metal vessel halves. U.S. Pat. No. 3,181,897 shows a mechanical joint for connecting members together wherein a plurality of elongated locking elements interlock in a groove between two telescoping tubular members for releasably locking the two members together. U.S. Pat. No. 3,600,011 discloses a plurality of shaft pairs which are used to releasably lock two tubular members by means of a wedging action between each set of shaft pairs within a channel located between the telescoping walls of the two tubular members. A plastic rod is used in U.S. Pat. No. 3,606,402 to interlock plastic piping having mating sections with complementary semicircular grooves therein for receiving the rod.

Several problems are left unanswered by the prior art. Among these problems are how to construct a tape joint cylindrical vessel joining means wherein thermoplastic and thermoset materials are the basic load carrying members and the joint has a relatively large diameter, i.e., greater than 6 inches. Thermoplastic and thermoset materials are readily deformable under stress or load conditions as contrasted with metal materials, which tend to retain their original shape and configuration under these conditions. Conventional locking joint members designed for metalic vessel members fail to compensate for the deformable nature of the plastic vessel members.

Additionally, the prior art fails to teach how a single tape member can be used to join a relatively large diameter member wherein assembly is easily accomplished by hand, i.e., no forceful aids such as a hammer are required, and the presence of grit in the grooves or tape cavity, causes no difficulties in assembly.

SUMMARY OF THE INVENTION

The present invention provides for a tape joint for separable cylindrical telescoping members wherein the cylindrical members may be constructed of a flexible man-made material such as a thermoplastic or thermoset material. Assembly is easily accomplished by hand and the presence of grit in a channel-shaped recess or groove between the members causes no difficulties in assembly. A solution to this problem is achieved by providing a single flexible tape member which is rounded on two opposite load bearing corners to reduce stress concentration in the members, and to promote the tape seeking a position of least load.

Further, the tape is inserted through an access in the outer member into the channel where it deforms in a twist and essentially fills the entire cavity provided between the two cylindrical members to avoid build up of debris. The members provide abutment surfaces at opposite sides of the channel. Thus, due to the twisting, the tape's line of load as fabricated and in its relaxed state, is slightly different than the apparent line of load of the tape in the cavity to promote two-line contact between the members and the tape along the abutment surfaces of the channel or groove. This two-line contact permits the tape to "wipe clean" of debris or grit a path along the length of the groove as it is inserted. The twisted nature of the tape provides positive positioning of the tape prior to the pressurization of the vessel and thus loading on the tape. This positive positioning of the tape within the groove insures the two-line contact which aids in the "wiping" action. In essence the twisting preloads the tape.

The twisted nature of the tape in the groove or channel also permits the tape to compensate for the deformation of the cylindrical vessel walls during pressurization of the vessel by inducing the tape to remain seated against the abutment surfaces formed in the cylindrical members thereby maintaining a small moment arm between the contact point of the tape member with the vessel member and the point of bending stress in the wall of the vessel member. Further, the twisted nature of the tape permits the abutment surfaces of the vessel members to be formed in a straight draw molding procedure without requiring a pocket to be formed to retain the tape during deformation of the vessel member.

Additional benefits resulting from this invention are that the outer tape end and the outer cylindrical vessel half cooperate to provide a safety locking means. Also, the assembly allows complete freedom of rotational position between the two vessel halves.

DESCRIPTION OF THE DRAWINGS

FIG. 1 is a top sectional view showing the tape joint of the present invention.

FIG. 2 is a partial sectional view taken generally along lines II—II of FIG. 1.

FIG. 3 is a partial sectional view taken generally along lines III—III of FIG. 1.

FIG. 4 is a partial side elevational view of the locking means shown in FIGS. 1 and 3 showing the slit formed in the outer vessel half.

FIG. 5 is a diagrammatic view showing the cross section of the tape in full lines and depicting in dotted lines how the orientation changes upon insertion.

DESCRIPTION OF THE PREFERRED EMBODIMENTS

In FIG. 1 a tape joint for cylindrical members is shown generally at 10 and comprises the assembly of a first outer hollow cylindrical member or vessel half 12 encompassing a second inner hollow cylindrical member or vessel half 14 with a flexible tape member 16 therebetween.

The flexible tape member 16 has a length approximate to the circumference of an outer circumferential surface 18 of the second cylindrical member 14 such that a first end or tip 20 of said tape member 16 is positioned relatively close to a second end or heel 22 when the tape is inserted into an annular channel shaped cavity or groove 24 between the first member 12 and the second member 14.

In order to provide an access opening for accommodating insertion of the tape into the channel-shaped cavity or groove 24, a circumferential slit 28, as best seen in FIG. 4, is provided in the first cylindrical member 12. The tape member 16 may be constructed of a plastic material such as a thermoplastic and may be molded in a generally circular or spiral shape approximating the configuration it will assume in the assembled position within the cavity 24 but preferably having a slightly greater major diameter than the assembled cavity 24 diameter so that the tape will tend to spring or push outwardly when in the assembled position. Also the tape is molded to have a cross sectional shape generally the same shape as the cavity 24, however the tape should be molded such that it will be required to deform in a twist upon insertion into the cavity.

A handle member 30 is provided at the second end or heel 22 of the tape 16 for aiding in the insertion and removal of the tape 16 from the cavity 24. A rib member forms a stop 32 at one edge of the slit 28 to engage an adjacent nose portion 34 of the handle 30. A heel portion 36 of the handle member 30 engages and is selectively locked against a stop 38 formed in the outer member 12 at an opposite end of the slit 28 from the stop 32. A central opening 39 is provided in the handle 30 providing a means for gripping and manipulating the handle and the tape.

Referring to FIG. 2, it is seen that the first cylindrical member or vessel half 12 has formed at one end thereof an outwardly flared skirt portion 40 having at a bottom end thereof a protruding lip or rim 42 on an interior circumferential surface 44 thereof. The lip or rim 42 has a flat upper surface 43. The junction between the interior surface 44 and the upper surface 43 of the lip 42 is generally rounded as at 46. A circumferential step 48 is provided on the interior surface 44 above the skirt portion 40 to receive a top end 50 of the second cylindrical member or vessel half 14.

The angularity of the flared skirt portion 40 and the radial inward extent of the lip 42 is constructed and arranged so that there is a throat 47 formed between the adjoining outer surface 18 of the inner member 14 which is of a selected dimensional extent.

An annular channel 52 is provided in the outer circumferential surface 18 of the second member 14 adjacent an axially disposed portion 54 of the interior surface 44 of the first member 12 for receiving a sealing means 56 therebetween. Sealing means 56 may be comprised of a conventional O-ring seal.

An annular flange 58 with a flat lower surface 59 is provided on the outer circumferential surface 18 of the second cylindrical member 14 below the annular channel 52 such that when the second cylindrical member is telescopingly received within the first cylindrical member and the top end 50 of the second member abuts against the step 48 of the first member, the cavity 24 will be formed between the annular flange 58 on one end and the lip 42 on an opposite end and the interior surface 44 of the first member on one side and the outer surface 18 of the second member on the other side. The joint between the lower surface 59 of the flange 58 and the outer surface 18 is generally rounded as at 62. The tape member 16 is to be received within the cavity 24 and the tape member is sized such that it will abut against the flat lower surface 59 of the flange 58 at a top end 64 and against the flat upper surface 43 of the lip 42 at a bottom end 66 and has a cross section complementing the cavity 24 such that the tape essentially fills the cavity. The flange 58 and the lip 42 form abutment surfaces at opposite ends of the channel-shaped cavity 24.

More specifically, as seen by a cross sectional view of the preferred embodiments of the tape 16, in FIG. 5, it appears as a three-sided member having a generally triangular cross sectional shape. The triangular shape is formed to have several advantages. The flared nature of the skirt 40 results in a generally triangular channel 24 being formed between the vessel halves 12, 14. A triangularly cross sectional shape essentially fills this cavity preventing debris or grit from being deposited in the cavity 24. The throat 47 through which debris may be pushed when inserting the tape 16 is thus essentially closed when the tape 16 is in an inserted position. Also the triangular shape provides that the tape 16 will be positioned adjacent walls 18 and 44 to insure against the tape becoming unintentionally dislodged especially if there are opposites in the tolerance extremes present in the diameters of the two vessel halves 12, 14.

When the tape 16 is in its relaxed or fabricated state, as shown by the solid lines in FIG. 5, that is, when the tape is not inserted into the cavity 24, the sides of the tape are disposed such that a first side 68 is comprised of a first flat wall, a second side 70 is comprised of a second flat wall, the first side 68 and the second side 70 being joined at the top end 64 of the tape in a generally rounded manner and at an acute angle A of approximately 16°. A third side 72 of the tape is comprised of a third flat wall connecting the first wall 68 and the second wall 70.

The wall 72 is of a dimensional extent greater than the width of the throat 47 so that the tape will be captured in the channel-shaped cavity 24. The third wall 72 and the second wall 70 are joined at the bottom end 66 of the tape in a generally rounded manner at an angle B of less than 90°, approximately 61°. The third wall and the second wall are joined in a generally angular manner as at 74 at an angle C of more than 90°, approximately 103°. When the tape is carried within the cavity 24, the first side 68 is adjacent the outer surface 18 of the second member 14. The first side 68 is closer to the outer surface 18 near the top end 64 of the tape than at the bottom joint 74, thus forming an angle between the walls. The second side 70 of the tape is adjacent the interior surface 44 of the first member 12. The second side 70 is closer to the interior surface 44 near the bottom end 66 of the tape than at the top end 64, thus forming an angle between the walls.

The tape's line of load as fabricated and in its relaxed state as shown by line 76 in FIGS. 2 and 5, is slightly different than the apparent line of load as shown by line 78 when the tape is inserted into the cavity 24 because of the twisted nature of the tape in the cavity. Two-line contact between the tape 16 and the first and second members at points 80 and 82 is thus promoted during assembly of the tape into the channel or cavity 24.

From the foregoing, it will be apparent that the generally triangular shape of the tape 16 in cross section is characterized by a hypotenuse corresponding to long leg 70 opposite the two legs 68 and 72 which prescribe the obtuse angle C between them. Thus, when the tape is inserted into the channel, the flexible nature of the tape permits the tape to deform in a twist as it is slip fitted into the cavity through slit 28. This torsion of the tape causes the line contact at point 80 and 82. The rounded corners 62 and 66 are between the hypotenuse and the opposite legs so that effective line contact is effected along the length of the channel 24.

The tip 20 of the tape, having a cross section generally of the same shape and size as the channel or cavity 24 and having a squared off or blunt end, dislodges and "wipes clean" any debris located in the cavity and causes it to fall through the open throat 47 at the bottom of the cavity. This open throat also provides the benefits of facilitating the maintenance of the joint such as cleaning the channel while the tape is in place or providing access to a tape which may have broken in the channel.

Second, after insertion, the tape will be positioned close to the inner surface 44 near the bottom end 66 of the tape and the outer surface 18 near the top end 64 of the tape for a minimum stress operation under vessel pressure. Points 84 and 86 are locations of high bending stress in the second and first members respectively. This bending stress is reduced by the snug fitting tape at these positions, without the need for close toleranced parts, in that the tape 16 readily conforms to the deformation of the members during pressurization of the vessel and thus insures a small moment arm between the line of load and the points of bending stress is maintained.

The torsion or twist of the tape 16 causes the tape to assume a biased position within the cavity 24. This not only results in two-line contact as at point 80 and 82 to aid in the reduction of bending stress at locations 84 and 86 when there is a positive pressure within the two members, causing the step 48 to move away from end 50, but also provides positive positioning when a negative pressure or vacuum exists within the two members causing step 48 and end 50 to move toward each other. This positive positioning is especially crucial if the vessel halves 12, 14 are subjected to an internal negative pressure and then an internal positive pressure. Without the positive positioning, the tape 16 could become dislodged during the negative pressure phase of operation due to a removal of the load from the tape 16 and when the positive pressure phase begins, the dislodged tape could cause improper loading on various parts of the vessel halves 12, 14.

Upon positive pressurization of the vessel, the two vessel halves are expected to translate axially away from each other and cause the tape to support the separation forces. Radial deformation of the vessel walls will have no effect on the relative fit or ability of the tape to support the expansion forces or act as a locking means during contraction.

Once the tape is fully inserted with the nose portion 34 of the handle 30 abutting against the step 32, and the free end or handle portion 30 is released, the heel 36 of the handle will snap against and engage the block 38 thereby locking the tape in place and prohibiting the tape from working loose by itself. This locked position is shown in FIG. 3.

A side elevational view of the handle 30 in the locked position is shown in FIG. 4.

To remove the tape from the cavity 24, the handle 30 is urged in a radially outward direction causing the heel portion 36 to disengage from the stop 38. The size of the tape cross section adjacent the nose portion 34 of the handle 30 is reduced as at 88 to allow the handle portion 30 to be urged radially outward. As this is accomplished, the nose 34 of the handle 30 pivots on the stop 32, thereby permitting a tangential force away from stop 32 to cause the tape 16 to be removed from the cavity 24. When the tape is completely removed from the cavity, the two members may be easily disassembled.

The outer surface 18 of the second or inner member 14 is symmetrical around its entire circumference allowing complete freedom of rotational position between the two members or vessel halves.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A pressure vessel comprising:
 a selectively removable first half,
 a second half,
 said first half having a circumferential wall flared outwardly and having an opening therein forming an inner circumferential surface,
 said inner circumferential surface having an annular lip formed thereon at the flared open end thereof,
 said lip projecting radially inwardly and being joined to said inner surface in a rounded manner,
 said inner circumferential surface also having an annular radially inwardly projecting step provided a given distance axially inwardly of said opening for receiving and abutting said second half,
 said circumferential wall having a circumferential slit formed therethrough immediately adjacent said lip and spaced away from said step,
 said slit being bounded by end walls,
 said second half having a circumferential wall with an outer surface sized to telescopically mate with said opening in said first half,
 said outer surface having an annular flange formed thereon being joined to said surface in a rounded manner,
 the outer diameter of said wall and said flange being less than the inner diameter of said lip and greater than the inner diameter of said step such that when said second half is mated with said first half, the mating end of said wall abuts said step, and said outer surface and said flange are received within said flared portion of said first half thereby forming an annular cavity between said walls,
 said cavity being bounded on one side by said flange, on an opposite side by said lip, and on opposing sides by said interior surface of said first member and said outer surface of said second member,
 said cavity having a generally triangular cross section due to the flared disposition of said inner surface resulting in the distance between said surfaces to be less adjacent said flange than adjacent said lip,
 said triangular cross section defining an angle having its vertex at the flange and its legs running through said lip and parallel to said outer surface,
 said cavity communicating with the exterior of said first half by means of said slit,
 a flexible tape member having a length approximating the circumference of said outer surface and sized to essentially fill said cavity,
 said tape member formed having a generally triangular cross section approximating said cross section of said cavity but having a slightly smaller angle between a tape wall connecting an edge positionable against said lip and an edge positionable against said flange, and said leg parallel to said outer surface causing said tape to deform in a twist as it is inserted into said cavity through said slit, said deformation of said tape member causing it to have essentially two line contact along its length in said cavity along said rounded joint of said flange and said rounded joint of said lip, said tape member having a handle attached to a heel end thereof for abutting said end wall of said slit and selectively locking said tape member within said cavity resulting in said first and second halves being locked in assembled relationship, and aiding in removal of said tape from said cavity allowing said first and second halves to be disassembled.

2. The device of claim 1 wherein said cavity additionally communicates with the exterior of said first half by means of an annular space formed between said lip and said outer wall of said second half whereby said tape is accessible along its length when said halves are locked in assembled relationship.

3. The device of claim 1 wherein said tape is formed of a resilient flexible material and said deformation of said tape preloads said tape causing it to continuously abut said lip and said flange while said halves are locked in assembled relationship thereby providing continuous support between said lip and said flange.

4. A pressure vessel comprising:
a selectively removable first half,
a second half,
   said first half having a circumferential wall flared outwardly and having an opening therein forming an inner circumferential surface,
   said inner circumferential surface having an annular lip formed thereon at the flared open end thereof,
   said lip projecting radially inwardly,
   said inner circumferential surface also having an annular radially inwardly projecting step provided a given distance axially inwardly of said opening for receiving and abutting said second half,
   said circumferential wall having a circumferential slit formed therethrough immediately adjacent said lip and spaced away from said step, said slit being bounded by end walls,
said second half having a circumferential wall with an outer surface sized to telescopically mate with said opening in said first half,
   said outer surface having an annular flange formed thereon,
   the outer diameter of said wall and said flange being less than the inner diameter of said lip and greater than the inner diameter of said step such that when said second half is mated with said first half, the mating end of said wall abuts said step, and said outer surface and said flange are received within said flared portion of said first half thereby forming an annular cavity between said walls,
   said cavity being bounded on one side by said flange, on an opposite side by said lip, and on opposing sides by said interior surface of said first member and said outer surface of said second member,
   said cavity having a generally triangular cross section due to the flared disposition of said inner surface resulting in the distance between said surfaces to be less adjacent said flange than adjacent said lip,
   said triangular cross section defining an angle having its vertex at the flange and its legs running through said lip and parallel to said outer surface,
   said cavity communicating with the exterior of said first half by means of said slit and by an annular space formed between said lip and said outer surface,
a flexible tape member having a length approximating the circumference of said outer surface,
   said tape member formed having a generally triangular cross section approximating said cross section of said cavity but having a slightly smaller angle between a tape wall connecting an edge positionable against said lip and an edge positionable against said flange, and said leg parallel to said outer surface causing said tape to deform in a twist as it is inserted into said cavity through said slit,
   said deformation of said tape member causing it to have essentially two line contact along its length in said cavity along said flange and said lip.

5. The device of claim 4 wherein said tape member has a locking handle means attached to an end thereof to assist the insertion and removal of said tape member and which is to abut said slit end wall to lock said tape member into place.

* * * * *